3,197,370
PYRILAMINE TANNATE COMPOSITIONS
Edward J. Hanus, Palisade, and Sheldon Siegel, Westfield, N.J., assignors to Merck & Co., Inc., Rahway, N.J., a corporation of New Jersey
No Drawing. Filed Feb. 6, 1961, Ser. No. 87,077
4 Claims. (Cl. 167—65)

This invention relates to pharmaceutical preparations containing pyrilamine and more particularly to preparations in which pyrilamine is present in the form of a tannate complex.

Pyrilamine is one of the most commonly used antihistamines. It has found wide acceptance in the treatment of various allergic disorders and is now commonly combined with other medicaments for the treatment of the common cold. For example, preparations containing pyrilamine maleate, aspirin and/or ascorbic acid are particularly effective for the symptomatic treatment of the common cold.

However, it has been found that pyrilamine salts such as pyrilamine maleate, pyrilamine hydrochloride and the like are incompatible with aspirin and ascorbic acid. Consequently, preparations containing a pyrilamine salt, aspirin and/or ascorbic acid are highly unstable and decompose quite rapidly. Therefore, such preparations must of necessity be prepared and consumed in relatively short periods of time in order to insure against the loss of their original therapeutic activity. It is obvious then, that a stable preparation of pyrilamine and aspirin and/or ascorbic acid retaining its original therapeutic activity, and therefore having utility over long periods, is highly desirable.

Although the problem has been described with particular reference to aspirin and ascorbic acid it is apparent that it applied to and includes other ingredients which are incompatible with pyrilamine salts.

In accordance with the present invention, it has been found that by contacting pyrilamine base with tannic acid there is produced a stable pyrilamine tannate complex which is highly compatible with aspirin, ascorbic acid and mixtures of the same. Preparations containing the pyrilamine tannate, aspirin and/or ascorbic acid are unusually stable and retain their original therapeutic activity over long periods of time. In addition, the pyrilamine in this form is substantially tasteless, odorless, and particularly well adsorbed when administered orally.

The pyrilamine tannate employed in the compositions of this invention may be prepared by reacting pyrilamine base with tannic acid in the manner described in Australian Patent No. 214,149 published April 24, 1958.

The compositions of the present invention may be readily prepared by intimately admixing the pyrilamine tannate with the aspirin and/or ascorbic acid. The resulting mixture can then be formulated into various oral dosage forms such as powders, tablets, pills, capsules and the like employing conventional formulating techniques. In such usage, the active components may be combined with solid diluents and/or tableting adjuvants such as flavoring agents, sweetening agents, binders, lubricants and the like.

Although the amount of pyrilamine present in the pyrilamine tannate complex varies depending on the conditions employed in the preparation of the complex, such as the ratio of pyrilamine to tannic acid used, it has been found that preparations of pyrilamine tannate in which the content of pyrilamine in the dried final product amounted to 10% to 45% or more are quite satisfactory for incorporation into various pharmaceutical dosage forms.

The amount of active components to be included in unit dose oral preparations such as tablets, capsules and the like may be varied widely. In general, however, therapeutically effective preparations may contain per unit dosage from about 3 to 40 milligrams of pyrilamine (in tannate form), 10 to 250 milligrams of ascorbic acid and/or 60 to 600 milligrams of aspirin.

The following examples show representative preparations contemplated by this invention and the manner in which such preparations are made. However, it is to be understood that these examples are intended for purposes of illustration only and are not intended as in any way limiting the scope of this invention which is defined in the appended claims.

*Example 1*

2.55 grams of the pyrilamine tannate (containing 33.6% pyrilamine base), 30.0 grams of aspirin and 1.5 grams of talc were blended dry, granulated and readily formed into 100 tablets. A similar product was prepared utilizing pyrilamine maleate. It was found that the product prepared using pyrilamine tannate was stable and retained substantially all of its original activity even when stored at 40° C. for extended periods of time whereas the product prepared using pyrilamine maleate started to decompose (as evidenced by a significant discoloration of the product) after several days.

*Example 2*

5.11 grams of the pyrilamine tannate (containing 33.6% pyrilamine base), 2.0 grams of ascorbic acid, 0.8 gram of talc and 7.9 grams of dicalcium phosphate were blended dry, granulated and formed into 100 tablets. A similar product was prepared utilizing pyrilamine maleate. It was found that the product prepared using the pyrilamine tannate was stable and retained substantially all of its original activity when stored at room temperature for prolonged periods of time whereas the product prepared using pyrilamine maleate started to decompose after several days.

*Example 3*

2.55 grams of pyrilamine tannate (containing 33.6% pyrilamine base), 30.0 grams of aspirin, 1.5 grams of talc and 2.5 grams of ascorbic acid were blended dry, granulated and formed into 100 tablets. A similar product was prepared using pyrilamine maleate. As in the preceding examples, the product prepared using pyrilamine tannate was stable and retained substantially all of its original activity when stored at 40° C. for extended periods of time whereas the product prepared using pyrilamine maleate started to decompose after several days.

*Example 4*

A preparation having the following composition was prepared as follows:

| | Mg./tablet |
|---|---|
| Pyrilamine tannate (36% pyrilamine base) | 50 |
| Ascorbic acid | 20 |
| Lactose | 70.7 |
| Starch | 7.8 |
| Magnesium stearate | 1.5 |

The tannate and ascorbic acid were mixed together and the resulting mixture blended with a previously prepared granulation of the lactose and starch. Magnesium stearate was then added and the mixture compressed into tablets. The tablets thus prepared were found to be stable for 1 year at room temperature.

Various changes and modifications of the invention can be made, and to the extent that such variations incorporate the spirit of the instant invention, they are intended to be included within the scope of the appended claims.

What is claimed is:

1. A pharmaceutical preparation for oral administration comprising a stable, solid intimate admixture of pyrilamine tannate and at least one ingredient selected from the group consisting of aspirin and ascorbic acid.

2. The preparation of claim 1 wherein the preparation contains ascorbic acid.

3. The preparation of claim 1 wherein the preparation contains aspirin.

4. The preparation of claim 1 wherein the preparation contains a mixture of ascorbic acid and aspirin.

References Cited by the Examiner

JAMA, 151: 16, p. 1430, Apr. 18, 1953.
Modern Drugs, The Journal of the Modern Drug Encyclopedia, July 1958, p. 267.
Wilson et al.: American Drug Index, 1959, pp. 75, 78 and 513.

JULIAN S. LEVITT, *Primary Examiner.*

WILLIAM B. KNIGHT, MORRIS O. WOLK, LEWIS GOTTS, *Examiners.*